(12) United States Patent
Ji et al.

(10) Patent No.: US 12,677,115 B2
(45) Date of Patent: Jul. 7, 2026

(54) METHOD TO ASSIST MESSAGE TRANSMISSION IN NON-TERRESTRIAL NETWORK WITHOUT FEEDER LINK

(71) Applicant: Qualcomm Incorporated, San Diego, CA (US)

(72) Inventors: Lianghai Ji, San Diego, CA (US); Jun Ma, San Diego, CA (US); Mohamad Sayed Hassan, Paris (FR)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/230,085

(22) Filed: Aug. 3, 2023

(65) Prior Publication Data

US 2025/0048063 A1 Feb. 6, 2025

(51) Int. Cl.
*H04W 4/12* (2009.01)
*H04W 84/06* (2009.01)
*H04W 92/18* (2009.01)

(52) U.S. Cl.
CPC .............. *H04W 4/12* (2013.01); *H04W 84/06* (2013.01); *H04W 92/18* (2013.01)

(58) Field of Classification Search
CPC ........ H04W 4/12; H04W 84/06; H04W 92/18
USPC ......................................................... 370/329
See application file for complete search history.

(56) References Cited

U.S. PATENT DOCUMENTS

2022/0239417 A1* 7/2022 Cheng ................... H04L 1/1835
2023/0199694 A1* 6/2023 Ghanbarinejad .. H04B 7/18563
                                                        455/456.2

OTHER PUBLICATIONS

Wu Zhi-Xiang, Managing discontinuous coverage in NTN, Nov. 15, 2024, pp. 8, 17-23 (Year: 2024).*

* cited by examiner

*Primary Examiner* — Jean A Gelin
(74) *Attorney, Agent, or Firm* — Dinsmore & Shohl LLP

(57) ABSTRACT

Certain aspects of the present disclosure provide techniques for receiving, from a non-terrestrial network (NTN) entity, a signal comprising an indication that the NTN entity supports relay operation, via an NTN, of messages associated with one or more services; and sending, to the NTN entity, a message associated with one of the one or more services and configured for relay, via the NTN, to one or more user equipments.

24 Claims, 11 Drawing Sheets

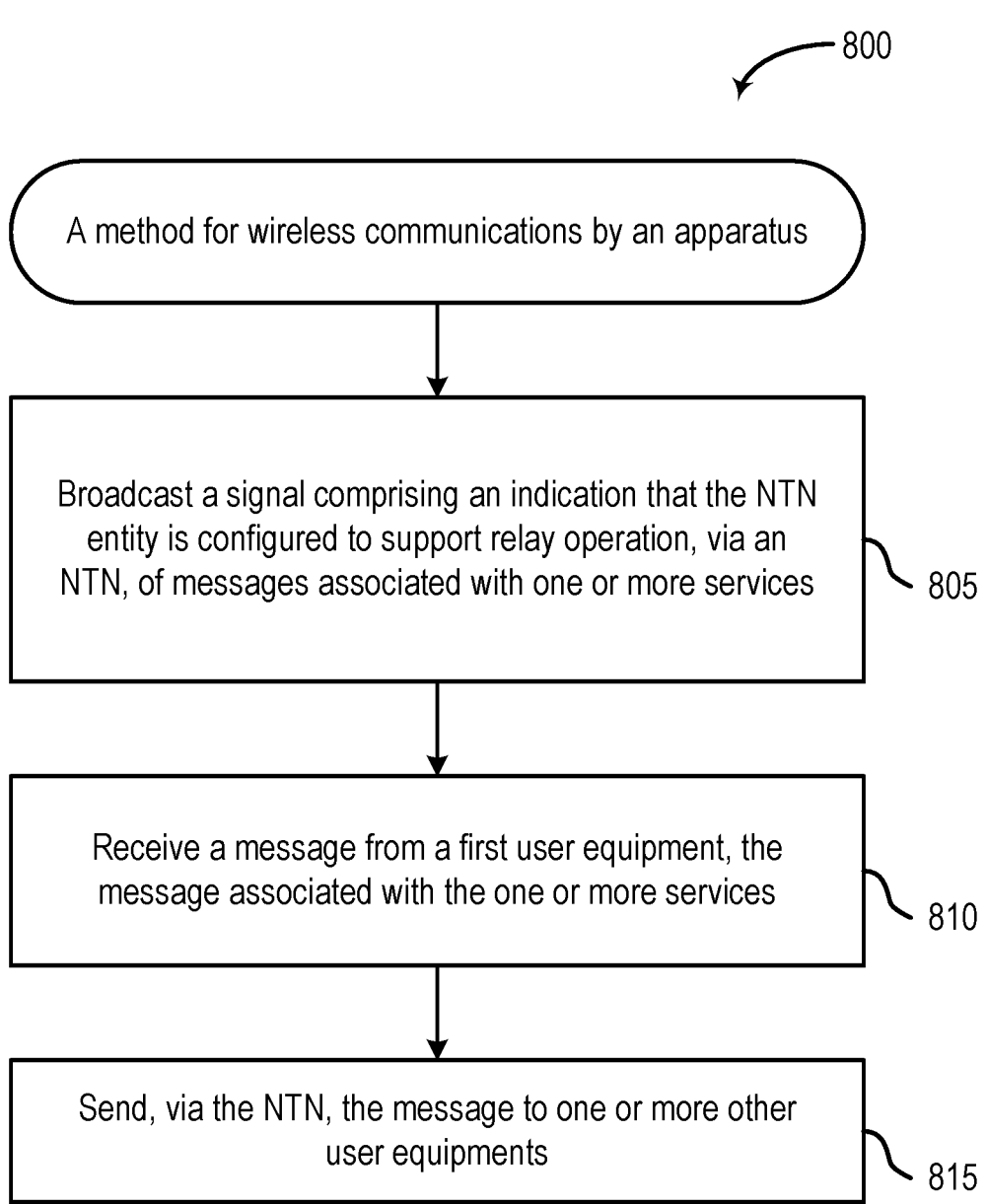

800

A method for wireless communications by an apparatus

Broadcast a signal comprising an indication that the NTN entity is configured to support relay operation, via an NTN, of messages associated with one or more services

805

Receive a message from a first user equipment, the message associated with the one or more services

810

Send, via the NTN, the message to one or more other user equipments

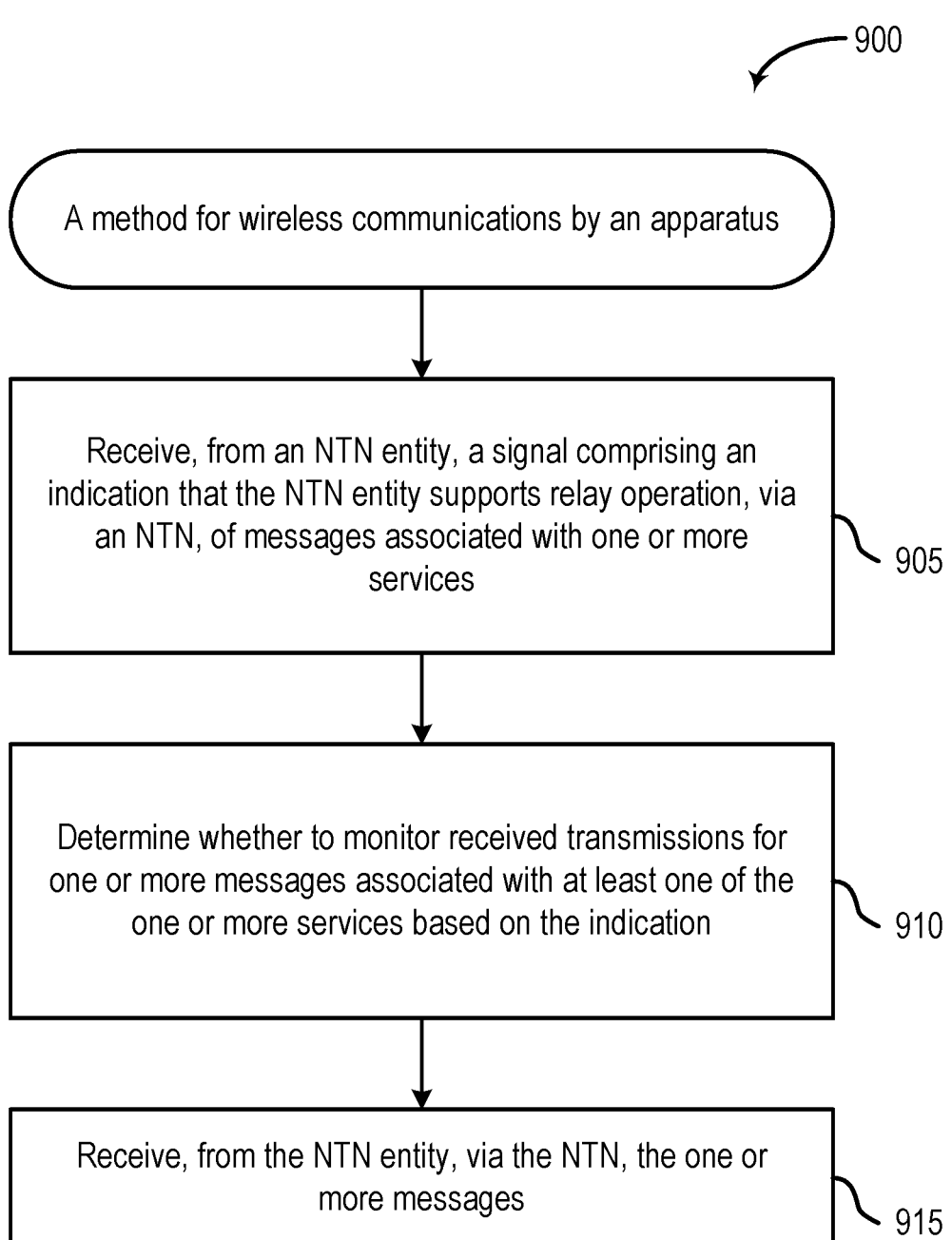

900

A method for wireless communications by an apparatus

Receive, from an NTN entity, a signal comprising an indication that the NTN entity supports relay operation, via an NTN, of messages associated with one or more services

905

Determine whether to monitor received transmissions for one or more messages associated with at least one of the one or more services based on the indication

910

Receive, from the NTN entity, via the NTN, the one or more messages

METHOD TO ASSIST MESSAGE TRANSMISSION IN NON-TERRESTRIAL NETWORK WITHOUT FEEDER LINK

INTRODUCTION

Field of the Disclosure

Aspects of the present disclosure relate to wireless communications, and more particularly, to techniques for indicating that a non-terrestrial network (NTN) entity supports direct non-terrestrial network communication between user equipments (UEs) and performing direct NTN communications via a NTN using the Uu interface in an Access Stratum (AS) layer to transport the upper layer data between UEs without a network feeder link.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving, from a non-terrestrial network (NTN) entity, a signal comprising an indication that the NTN entity supports relay operation, via an NTN, of messages associated with one or more services; and sending, to the NTN entity, a message associated with one of the one or more services and configured for relay, via the NTN, to one or more user equipments.

Another aspect provides a method for wireless communication by a non-terrestrial network entity. The method includes broadcasting a signal comprising an indication that the NTN entity is configured to support relay operation, via an NTN, of messages associated with one or more services; receiving a message from a first user equipment, the message associated with the one or more services; and sending, via the NTN, the message to one or more other user equipments.

Another aspect provides a method for wireless communication by a UE. The method includes receiving, from a NTN entity, a signal comprising an indication that the NTN entity supports relay operation, via an NTN, of messages associated with one or more services; determining whether to monitor received transmissions for one or more messages associated with at least one of the one or more services based on the indication; and receiving, from the NTN entity, via the NTN, the one or more messages.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 depicts another method for wireless communications.

FIG. 9 depicts another method for wireless communications.

DETAILED DESCRIPTION

Figure 1:
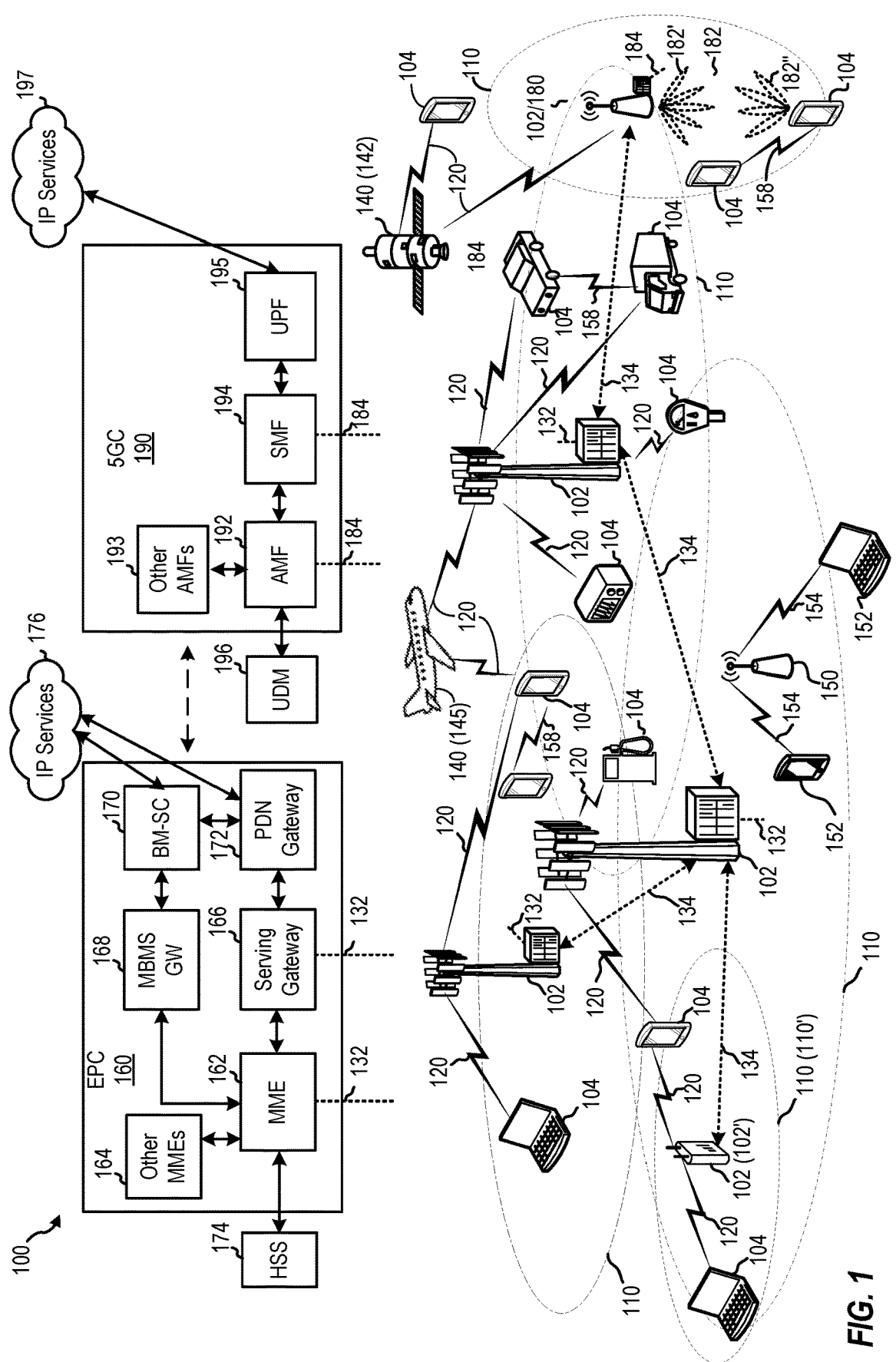
FIG. 1 depicts an example wireless communications network.

Aspects of the present disclosure provide apparatuses, methods, processing systems, and computer-readable mediums for indicating that a non-terrestrial network (NTN) entity supports direct non-terrestrial network communication between user equipments (UEs) and for performing direct NTN communications via a NTN using the Uu interface in an Access Stratum (AS) layer to transport upper layer data between two or more UEs without a feeder link. As used herein, "direct NTN communication" refers to two or more apparatuses (e.g., UEs) communicating with each other via the NTN without a feeder link.

Wireless apparatuses such as UEs are not always within a communication coverage area of a terrestrial network (TN), for example, within range of a base station (BS). For example, when UEs are in remote locations such as on open water, in a remote countryside, or the like, the probability that the UEs are within the communication coverage area of the TN is reduced. When UEs are not within a communication coverage area of a TN, the ability for a UE to communicate with other UEs decreases. While sidelink (SL) communication can enable direct communication between UEs without the need for data to go through a network, SL communication has a limited range. Furthermore, SL communications are typically limited in data transmission size.

However, a NTN with one or more NTN entities such as a satellite or aircraft enabled with wireless communication equipment can provide a non-terrestrial communication coverage area to multiple UEs that are otherwise not within the communication coverage area of the TN and/or too far from other UEs to establish and maintain SL communications. Additionally, multiple NTN entities configured to communicate with each other via an inter-satellite link (ISL) can enlarge the non-terrestrial communication coverage area.

Legacy NTN communications, however, are not an efficient solution for UEs outside of a coverage area of the TN or UEs that are beyond the range of establishing and maintaining a SL because in legacy NTN communications a message from a UE needs to travel through a ground network equipped with core network functions (e.g., session management function (SMF), user plane function (UPF), and others) via an NTN entity and then to the receiving UE, where the ground network equipped with core network functions is connected with the NTN entity via a feeder link and the equipped core network functions on the ground are responsible for routing the message from one UE to another UE, which causes additional delay and increased feeder link load. Furthermore, if core network functions are deployed onboard one or more multiple NTN entities, in instances of a non-geosynchronous NTN entity, the relatively quick movement of an NTN entity over ground requires that the UE perform frequent core network (CN) reconfigurations (e.g., user plane function (UPF) reconfiguration) and results in heavy signaling overhead.

For services such as Vehicle-to-Everything (V2X) communications, where there may be an infrequent need to send small messages using the legacy NTN, the frequent UPF/UE reconfiguration and the corresponding signaling overhead make the legacy NTN communication inefficient. Additionally, if the CN is set up only after a UE needs to send a message, for example, a message to other vehicles indicating a hazard detected on a road, there could be a large delay to set up the CN entities resulting in the message regarding the detected hazard becoming obsolete.

As such, there is a technical problem with communications between UEs, which are outside of the coverage area of the TN, attempting to utilize a legacy NTN to facilitate messaging between UEs without a feeder link between the NTN entity and the CN. A technical solution to at least the aforementioned technical problem is to configure one or more NTN entities to be equipped with a base station and provide an indication to UEs that the one or more NTN entities support relay operation, via an NTN, of messages associated with one or more services, such as V2X communication, internet of things (IoT) communication, and/or the like, and facilitate a direct NTN communication between UEs via the NTN. The indication provided by the NTN entity enables the UEs to determine whether communications for one or more services the UE desires to employ is supported by direct NTN communications.

Direct NTN communication via a NTN, which is described in detail herein, provides several technical benefits. Direct NTN communication between UEs without going through feeder link/ground network, can reduce latency and feeder link load, and enable communication between UEs when there is no available feeder link. Direct NTN communication provides an efficient solution for UEs to send and receive a message via one or more NTN entities in the NTN without the need for a feeder link to a ground network to complete the communication. For example, transmission delay and feeder link load is reduced as compared to communication over legacy NTNs. Additionally, the UEs are not required to set up and/or maintain a CN connection, which beneficially reduces signaling overhead and UE power consumption. Furthermore, communication coverage areas can be provided by NTN entities for relaying messages for one or more services between UEs where TNs do not provide coverage or are unreliable. As described in more detail herein, NTN entities in direct NTN communication may leverage the NTN Uu interface in the AS layer to transport the upper layer data (e.g. application or service data) between two or more UEs.

Aspects described herein may thus be used to improve message transmission between UEs in NTNs without needing a feeder link to facilitate the communication.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such, communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities 140), such as satellite 142 and aircraft 145 (collectively referred to herein as NTN entities 140), which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, a data center, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
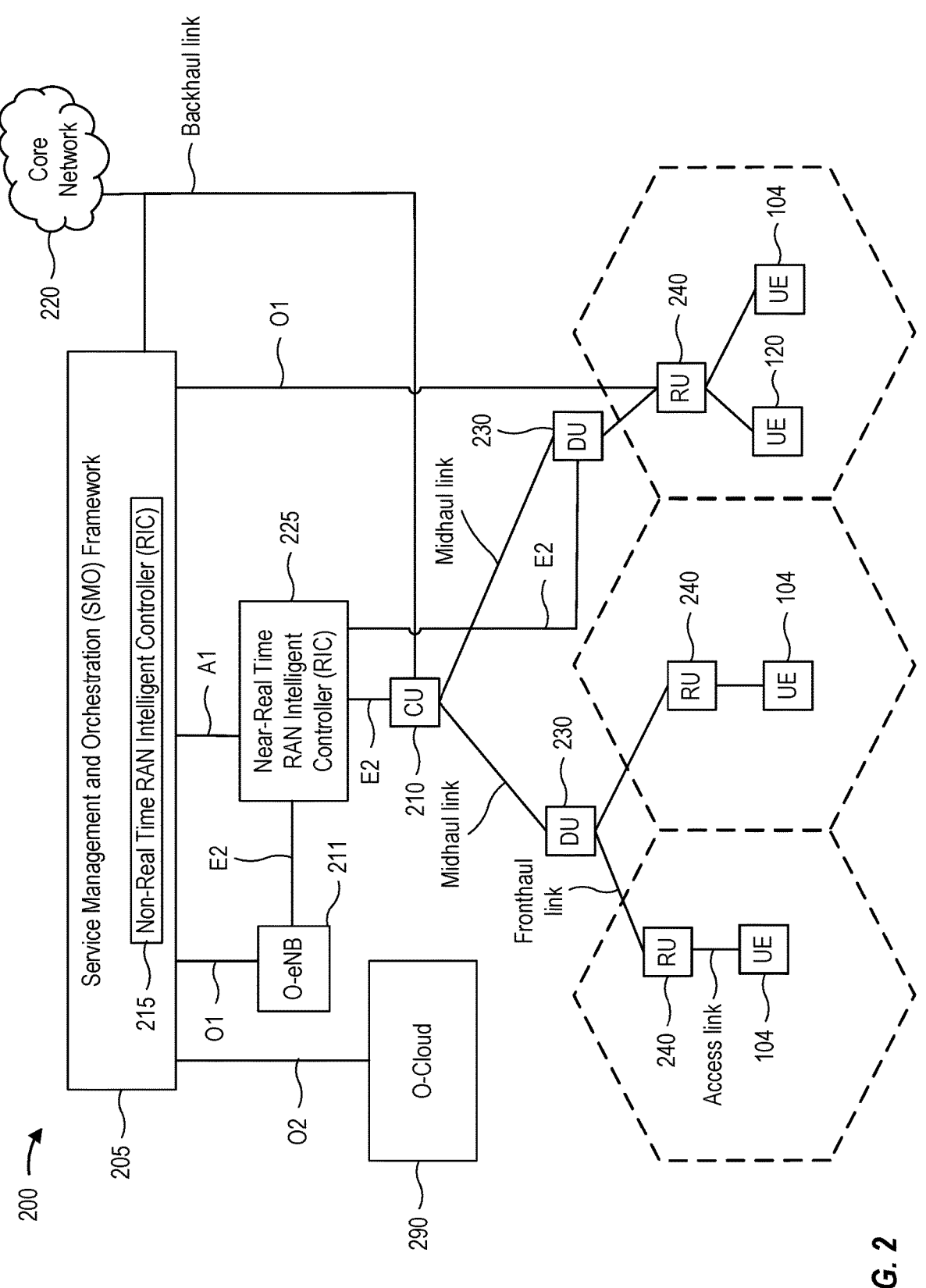
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
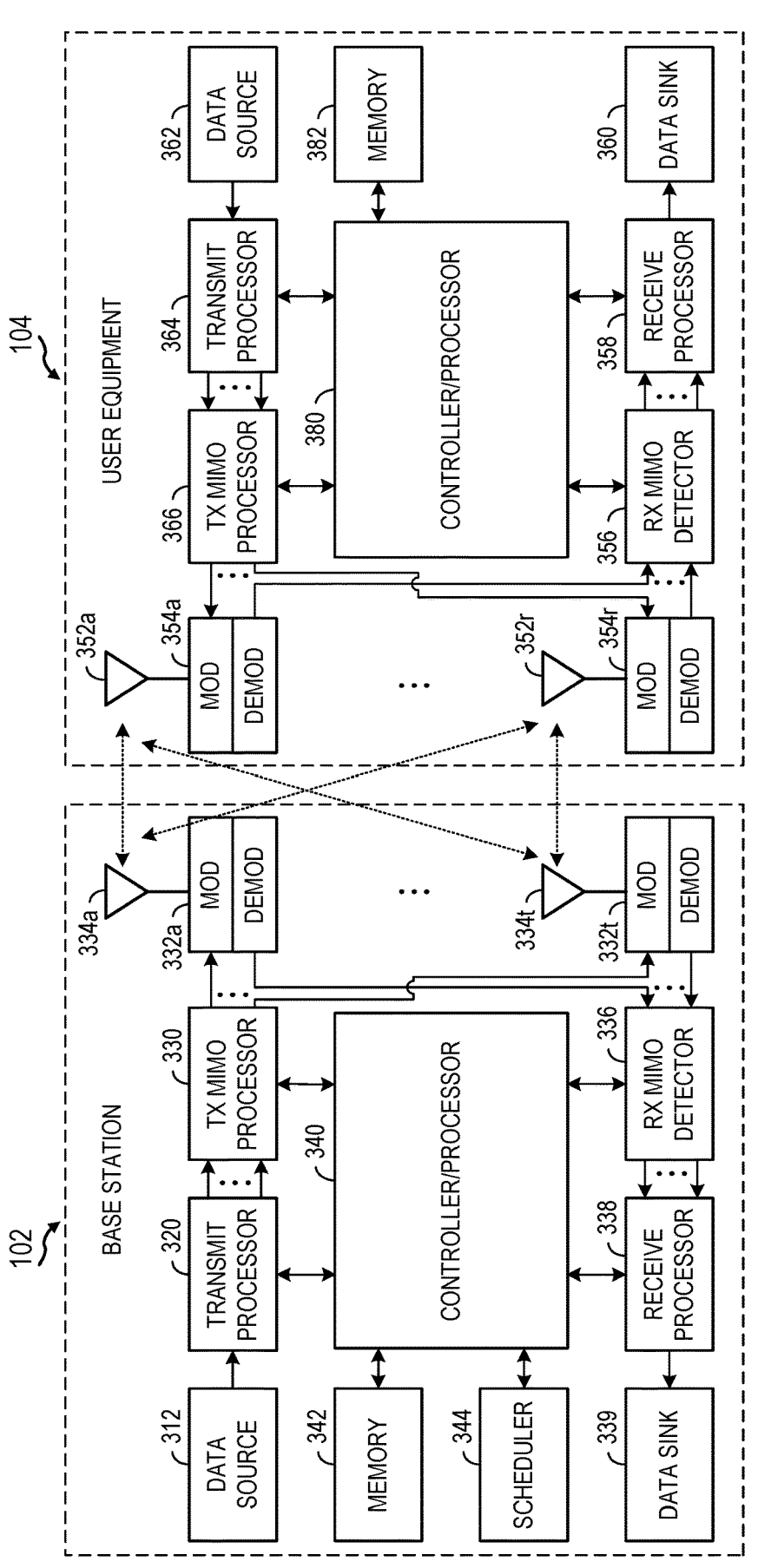
FIG. 3 depicts aspects of an example base station and an example user equipment (UE).

FIG. 3 depicts aspects of an example BS 102 and a UE 104. The BS 102 may be implemented on-board a NTN entity 140, in some aspects.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
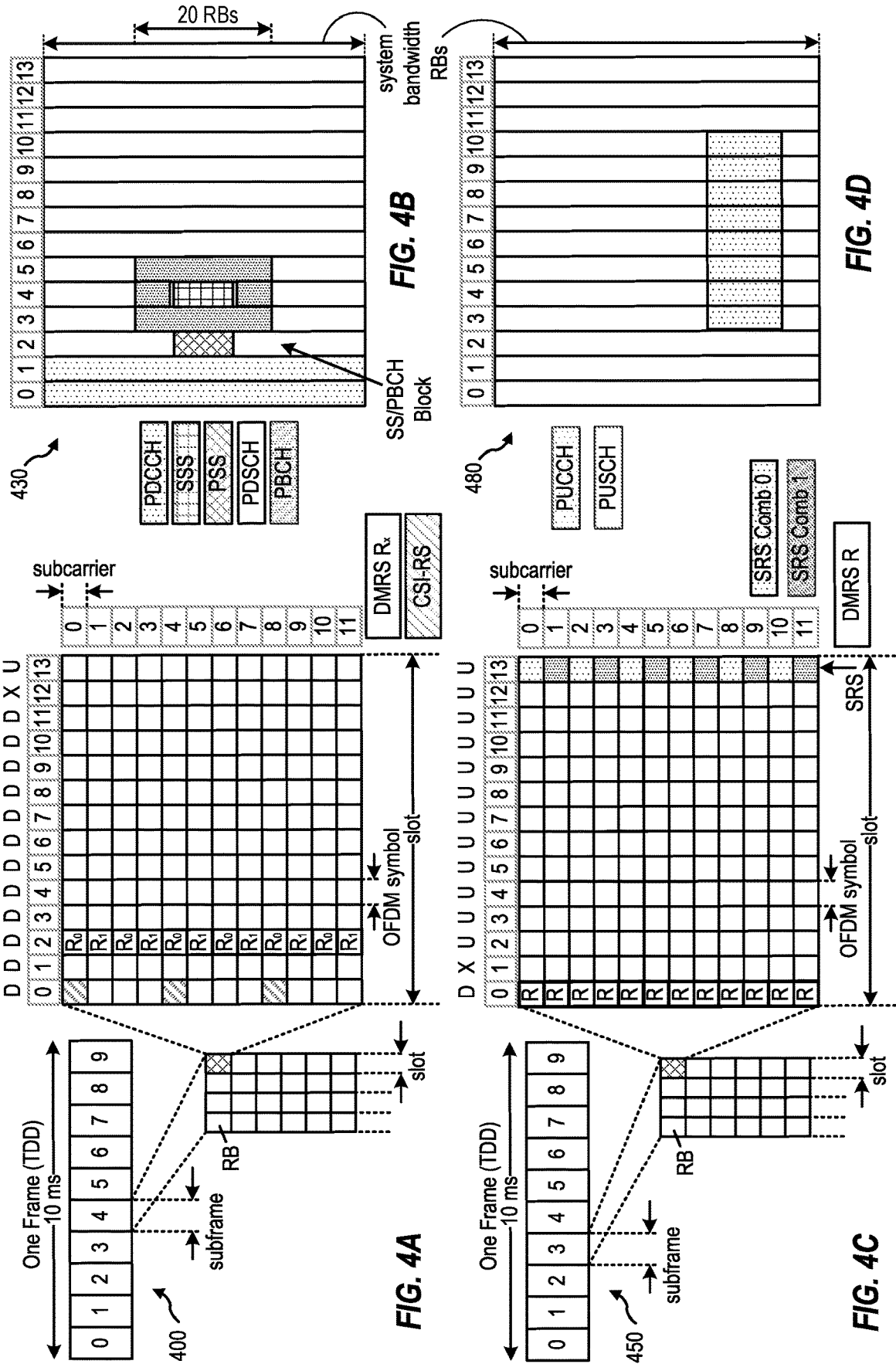
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (u) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2u slots/subframe. The subcarrier spacing and symbol length/duration are a function of the numerology. The subcarrier spacing may be equal to 24×15 kHz, where u is the numerology 0 to 5. As such, the numerology u=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to NTN Elements of a Wireless Communications Networks

An example wireless communication network is depicted and described herein with respect to FIG. 1. As discussed, wireless communications network 100 includes terrestrial aspects, such as ground-based network entities (e.g., BSs 102), and non-terrestrial aspects, such as satellite 142 and aircraft 145, which may include network entities on-board (e.g., one or more BSs) capable of communicating with other network elements (e.g., terrestrial BSs) and UEs.

Figure 5:
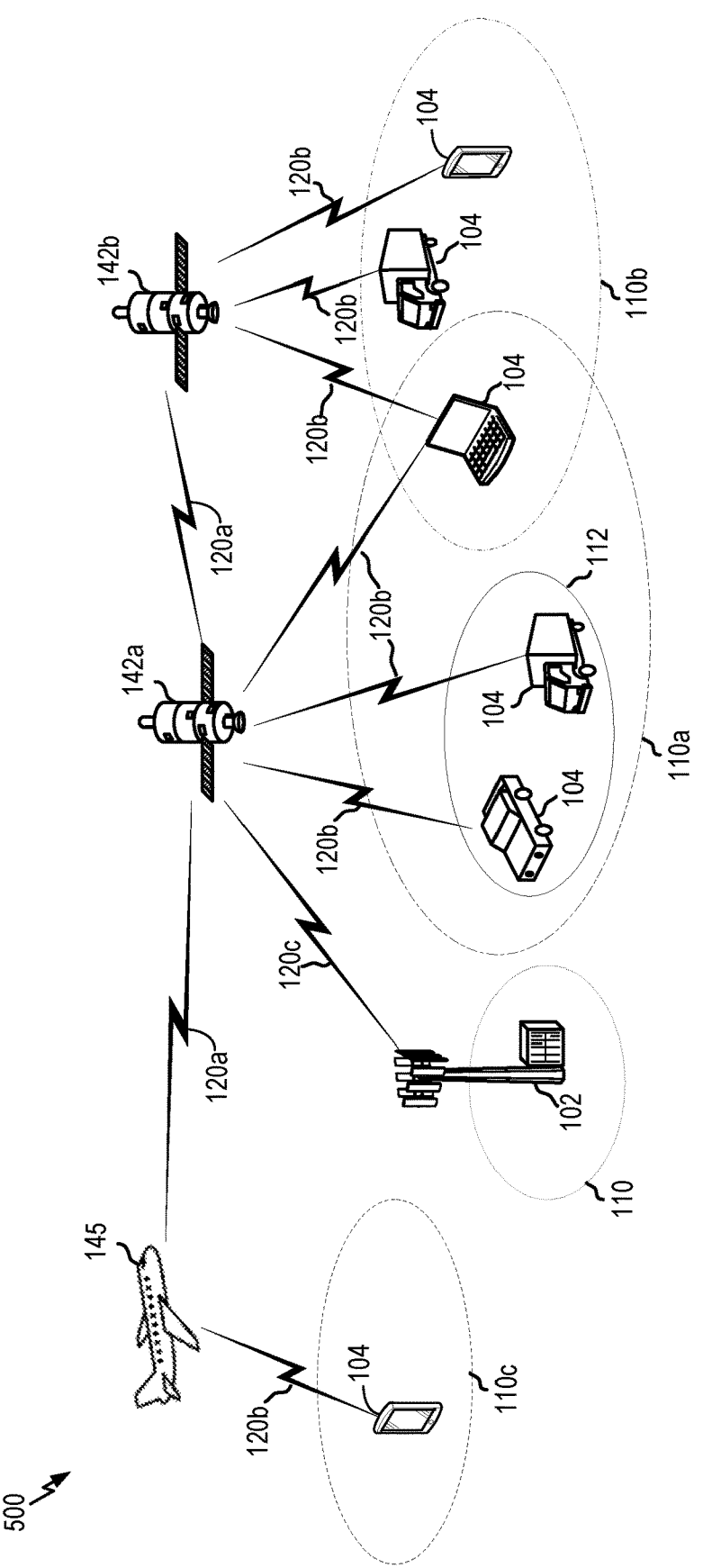
FIG. 5 depicts elements of a non-terrestrial network of the example wireless communication network depicted in FIG. 1.

FIG. 5 depicts various non-terrestrial aspects of the wireless communications network 100 as they pertain to the present disclosure. In FIG. 5 three NTN entities (e.g., an aircraft 145, a first satellite 142a, and a second satellite 142b, which are collectively referred to herein as NTN entities 140) are depicted. The NTN entities 140 wirelessly communicate with each other via communications links 120, which are referred to as inter-satellite links (ISL) 120a. The NTN entities 140 each may further wirelessly communicate with one or more UEs 104. NTN entity 140 to UE 104 communications links 120 are referred to as service links 120b. Additionally, one or more NTN entities 140 may wirelessly communicate with a TN such as a BS 102 via communications link referred to as a feeder link 120c. Aspects of the present disclosure consider situations where the feeder link 120c is not used for communication or is not available for use by the one or more NTN entities 140.

As discussed above with reference to FIG. 1, each of BSs 102 may provide communications coverage for a respective coverage area 110 (as shown in FIG. 1 and FIG. 5), which may sometimes be referred to as a cell, and which may overlap in some cases. Similarly, with reference to FIG. 5, each of the NTN entities may provide a communication coverage area 110. For example, the first satellite 142a may provide a communication coverage area 110a, the second satellite 142b may provide a communication coverage area 110b, and the aircraft 145 may provide a communication coverage area 110c. Each of the communication coverage areas 110a, 110b, 110c may include one or more UEs 104 located within the coverage area.

In some aspects, for example, when a UE 104 desires to send a message with a service such as a V2X communication, a targeted coverage area 112 may be indicated. The targeted coverage area 112 may be defined as a predefined distance around the UE 104. The targeted coverage area 112 is defined so that the message is sent to other UEs located within the targeted coverage area 112 because the message is likely relevant to those UEs located within the targeted coverage area 112 and the specific identify of each of the other UEs is not known by the transmit UE (TX UE). For example, the targeted coverage area 112 may be used when a first UE 104 (e.g., a vehicle) desires to transmit information regarding a detected hazard in the area to other UEs 104 in the vicinity. The NTN entity receiving the additional information of the targeted coverage area 112 for a message from the first UE 104 can determine whether the targeted coverage area 112 is within and/or less than the reachable area that the NTN entity (e.g., the first satellite 142a) is capable of sending messages to other UEs 104. In some aspects, the NTN entity (e.g., the first satellite 142a) may further determine whether a communication coverage area of one or more other NTN entities (e.g., the second satellite 142b and/or the aircraft 145) includes the targeted coverage area 112 so that the message can be sent.

The aforementioned example is merely one example of a direct NTN communication supported by the NTN 500 described herein. It is understood that aspects of the present disclosure are directed to one or more NTN entities 140 indicating to UEs 104 that the NTN entities 140 support relay operation, via the NTN 500, of messages associated with one or more services such as V2X communications, IoT communications, video streaming service (e.g., between a local data center and a UE), voice call communications, video call communications, short message service (SMS) communication, multimedia messaging service (MMS) communication, and/or the like. As used herein "local data center" refers to a data center that is within the communication coverage area of an NTN entity.

In some aspects, a first UE generates a message associated with one of the one or more services for relaying to one or more other UEs 104 via NTN 500 based on the relay capability indication received from the NTN entity 140. The message may be directed to one or more specific UEs 104 with the inclusion of identification information or may be relayed as a broadcasted signal to all of or a portion of the NTN entity's 140 communication coverage area 110a, 110b, 110c.

Figure 6:
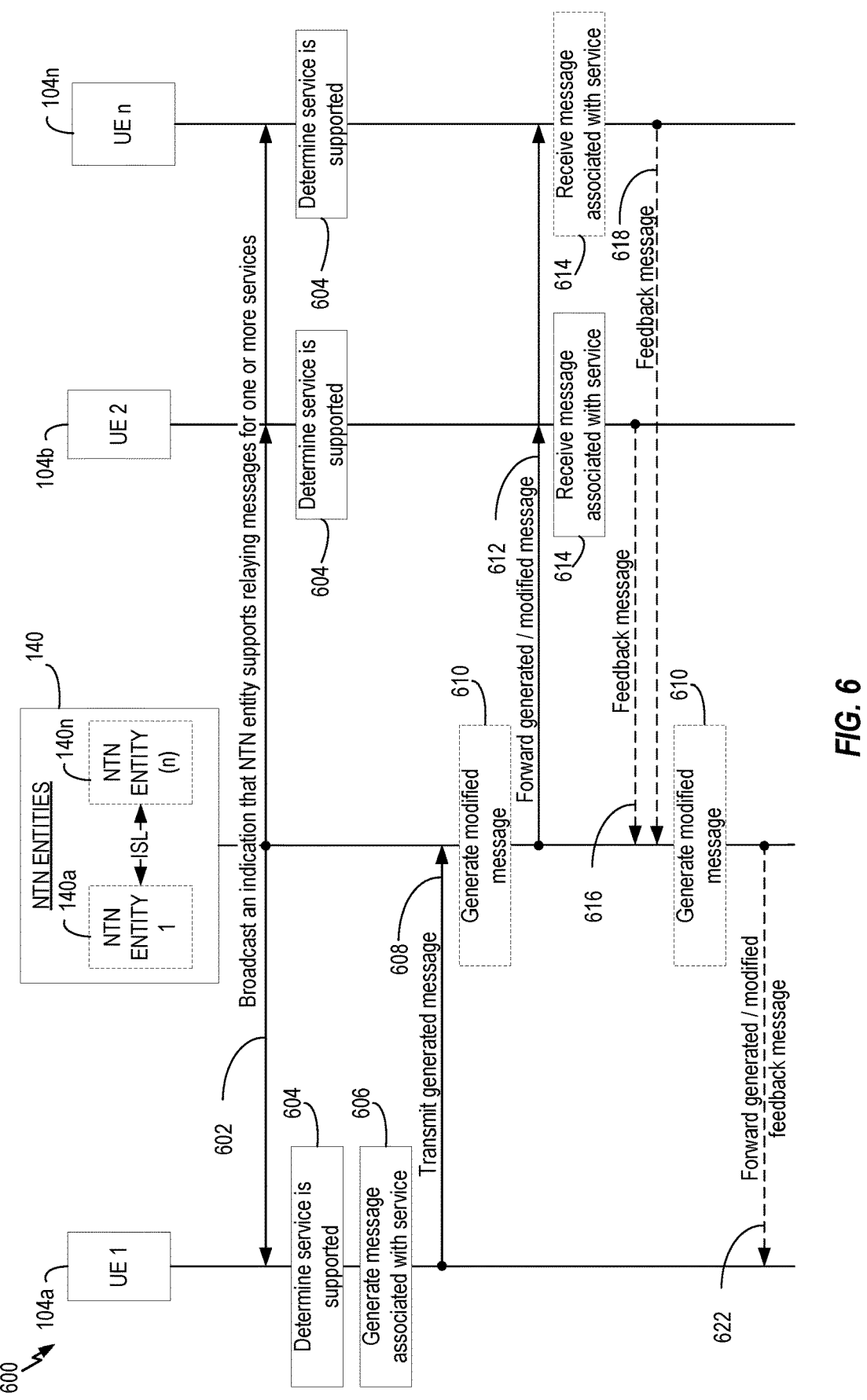
FIG. 6 depicts a process flow diagram of direct non-terrestrial network communications via the non-terrestrial network.

Aspects Related to Direct NTN Communication
Via an NTN Using the Uu Interface in an AS
Layer FIG. 6 depicts a process flow diagram illustrating communications between two or more UEs via one or more NTN entities. The process flow 600 illustrates operations of and communications between a first UE 104a, a second UE 104b, and one or more other UEs 104n via one or more NTN entities 140. Transmissions of the direct NTN communication occur over the Uu interface in the AS layer. The one or more NTN entities 140 communicate using inter-satellite links (ISLs). For example, in some instances, the direct NTN communication between two or more UEs is served by two or more NTN entities 140. The two or more NTN entities 140 coordinate with each other to facilitate forwarding a message from a transmit UE to one or more receiver UEs. The two or more NTN entities may coordinate and/or exchange information to determine the support services for the NTN and/or the respective reachable areas (e.g., the communication coverage areas). For example, a first NTN entity (e.g., the first satellite 142a) may forward a received message from a first UE to another NTN entity (e.g., the second satellite 142b, aircraft 145, or other NTN entity 140n), whom in turn communicates the message to one or more UEs 104 that are served by one or more other NTN entities.

The UEs 104 and NTN entities 140 are preconfigured prior to communicating via the NTN 500 (e.g., as depicted in FIG. 5) or configured upon communicating via the NTN with one or more identifications (IDs) corresponding to at least one of the one or more services or the one or more user equipments whose data can be relayed over direct NTN communication via the NTN. The IDs may be a UE ID or a service ID. A UE ID can be attached to a message to indicate to a receiver (e.g., an NTN entity 140 or another UE 104) that the message is intended for one or more specific UEs. Accordingly, a receiver (e.g., a receiver UE) can quickly determine whether they are the intended recipient of the message based on the UE ID. Likewise, a service ID can be attached to a message to indicate to the NTN entity 140 and/or receiver UE 104 (RX UE) that the messages pertains to a particular service. The service ID can cause the NTN entity 140 and/or the receiver UE 104 to adopt a predetermined method of routing or handling of the received message based on the service ID without needing to process the entire received signal defining the message.

Referring to the process flow of FIG. 6, at step 602, the NTN entity 140 transmits a signal comprising an indication that the NTN entity 140 is configured to support relay operation, via an NTN, of messages associated with one or more services. The indication may be broadcast in a system information block (SIB) and/or transmitted in a dedicated radio resource control (RRC) message. Any UE 104 within the communication coverage area (e.g., the communication coverage area 110a of first satellite 142a, the communication coverage area 110b of the second satellite 142b may provide, or the communication coverage area 110c of the aircraft 145) may receive the transmitted signal.

In some aspects, the indication message may provide additional information. For example, the indication may also indicate the reachable area (e.g., the communication coverage area) of the NTN entity 140. In some aspects, the reachable area is defined using a geographic coordinate system, for example, latitude and longitude or the Universal Transverse Mercator. A location may be indicated and a distance or radius about the location may be used to geographically define the reachable area of the NTN entity 140. The reachable area of the NTN entities 140 is the area where the NTN entities can receive a message from and/or where the NTN entities 140 can forward a message to. In some aspects, the additional information may include configuration information for transmitting and/or receiving via the NTN. The configuration information can provide, for example, a radio resource configuration or both a radio bearer and a logical channel. In providing the configuration information, a UE 104 subsequently generates and transmits a message using the configuration associated with the radio bearer and logical channel, which is configured to provide Quality of Service (QOS) support to the communication over the NTN.

In some aspects, the additional information may include traffic characters of a supported service, such as, for example, the maximum message size capable of being relayed over the NTN or an expected latency of a communication over the NTN.

In some aspects, the additional information may include information pertaining to a location of the one or more other user equipments. For example, the location of a local data center may be shared with other UEs 104 via the NTN entities 140. Alternatively, the location of static UEs, such as a local data center, may be preconfigured or periodically updated in the memory of the UE 104. As such, a UE 104 can determine from the reachable area of the NTN entity 140 whether a direct NTN communication can reach the local data center. Such information may be utilized in determining whether an IoT message can be forwarded by the one or more of the NTN entities 140.

The additional information can be transmitted in the same message as the indication that the NTN entity 140 is configured to support relay operation, or in a separate message.

Step 604 pertains to the UEs 104 receiving the transmitted signal. At step 604, the UEs 104 determine which of the one or more services are supported by the NTN based on the indication. When a service the UE 104 desires to use is supported, the UE 104 can generate a message for sending and/or monitor received transmissions for one or more messages associated with at least one of the one or more services determined to be supported by the NTN based on the indication.

For V2X service communications, for example, the TX UE may determine a targeted range for transmitting the V2X message. The targeted range may be defined by a radius from the location of the TX UE. The TX UE can determine, for example, whether the targeted range is located within the reachable area of the one or more NTN entities 140 (e.g., the communication coverage area 110*a* of first satellite 142*a*, the communication coverage area 110*b* of the second satellite 142*b* may provide, or the communication coverage area 110*c* of the aircraft 145). The determination can be made based on the additional information corresponding to the reachable area of the one or more NTN entities provided by the one or more NTN entities at step 602. If the targeted range is within the reachable area of the one or more NTN entities, the TX UE can determine that the V2X service is supported by the NTN.

As another example, the TX UE, at step 604, may determine whether an IoT service involving a local data center is a supported service. For example, the UE 104 can determine from the reachable area of the NTN entity 140 whether a direct NTN communication can reach the local data center. Such information may be utilized in determining whether an IoT message can be forwarded by the one or more of the NTN entities 140 to an IoT device such as the local data center.

The determination, at step 604, as to whether a service is supported by the NTN may be determined based on whether the message size of a message for transmitting and relaying by the one or more NTN entities 140 is less than or equal to a maximum message size. Additionally, the TX UE may also evaluate other parameters, such as whether a latency requirement for a service meets an expected latency of a communication over the NTN in making the determination that a service is supported by the NTN.

At step 606, a TX UE generates a message associated with a service that is supported based on the indication. The generated message may include a preconfigured service ID and/or a UE ID indicating one or more intended recipients of the message.

In some aspects, the generated message is configured to be transmitted over the Uu interface in the AS layer. Thus, for example, at step 608, the TX UE transmits the generated message for a supported service over the Uu interface in the AS layer. The transmitted message is to-be-relayed to one or more other UEs by the NTN using direct NTN communication. That is, the message is not routed through a feeder link or a TN in the process of being received by one or more other RX UEs. In transmitting the generated message, the TX UE can consider additional information such as resources for transmitting the message. For example, transmission may take place over a resource (e.g., range/pool) configured by the additional information. Thus, upon receiving the message (e.g., the signal carrying the message), the NTN entity can determine that the received message is associated with a direct NTN communication and may take corresponding actions to relay the message to one or more RX UEs or other NTN entities via ISL. In addition to transmitting the generated message, the TX UE may provide the NTN entity with information indicating a targeted recipient, a location of the targeted recipient, and/or a targeted range from the location of the TX UE for relaying the generated message. The aforementioned information directs the NTN entity to relay a transmission of the message to a specific recipient UE or a coverage area smaller than the total communication coverage area of the NTN entity. This enables the NTN entity to forward the message in an efficient manner.

At step 610, upon receiving a message from the TX UE, the NTN entity 140 may process the received message and generate a modified message that will be forwarded to one or more other UEs. The processing, generating, and forwarding of the modified message may be based on additional information such as the configuration for resources, a radio bearer and/or a logical channel. In some aspects, at step 610, the NTN entity 140 may act as an RF repeater and/or a frequency converter. For example, the NTN entity 140 may amplify the signal carrying the message, convert a frequency of the received signal to a different frequency, or the like, thereby generating a modified message or signal for forwarding. However, in some aspects, the NTN entity 140 may not generate a modified message and may instead merely operate as a repeater and forward the received message.

At step 612, the NTN entity 140 forwards the message (e.g., either the received message or the modified message) to one or more UEs with a broadcast signal or a multicast signal. In some aspects, a first NTN entity (e.g., a first satellite 142*a*) may communicate with one or more other NTN entities (e.g., a second satellite 142*b* and/or an aircraft 145) to forward the message to UEs that are not located within the communication coverage area (e.g., communication coverage area 110*a* depicted in FIG. 5) of the first NTN entity.

At step 614, one or more UEs receive a transmission of the forwarded message from the NTN entity. Upon receiving the forwarded message, the RX UE, may determine an attached ID to identify if it is the intended RX UE and/or if the message is associated with a service that the RX UE is monitoring for communications. If the RX UE receives a message which it is not the intended recipient of or pertains to a service that the RX UE is not monitoring for communications, the RX UE can discard the message without processing the message (e.g., without decoding the message). At step 614, the one or more RX UEs may be monitoring for transmissions within a predefined resource range based on the indication and/or the additional information. When the RX UE receives a forwarded message from the NTN entity that is determined to be for the RX UE or pertaining to a service the RX UE is monitoring, the RX UE, at step 614, processes the message.

In some aspects, the RX UEs, at steps 616 and 618, may send a feedback message (e.g., a response or acknowledgement message), which will be forwarded by the NTN entity to the TX UE. In an aspect, transmission of the feedback message make take account of additional information contained in the indication, such as the RRC, or both the radio bearer and the logical channel configuration.

At step 620, the NTN entity 140 may process the received message and generate a modified message (e.g., similar to step 610) that will be forwarded to the original TX UE (e.g., UE1 104*a*, which is now functioning as a RX UE). The processing, generating, and forwarding of the modified message at step 620 is similar to step 610. However, in some aspects, the NTN entity 140 may not generate a modified message and instead merely operate as a repeater and forward the received message.

At step 622, the NTN entity 140 forwards the message (e.g., the feedback message or a modified version of the feedback message) to the TX UE, for example, with a broadcast signal or a multicast signal, over the Uu interface in the AS layer.

It should be understood that the FIG. 6 is one example and that variations to the sequence of steps depicted and described with respect to FIG. 6 may be implemented without deviating from the technical solution of providing direct NTN communication between two or more UEs, via an NTN, with one or more NTN entities receiving and forwarding messages without using a feeder link or base station. Aspects described with respect to FIG. 6 create beneficial technical effects, such as reducing transmission delays between UEs and reducing feeder link loads. More generally, direct NTN communication beneficially enables communication between UEs where TNs are not accessible and over distances beyond those supported by SL communication. Additionally, by enabling NTN entities with, for example, base station functionality, direct communication between UEs without a feeder link to a TN and routing messages there through is enabled.

Figure 7:
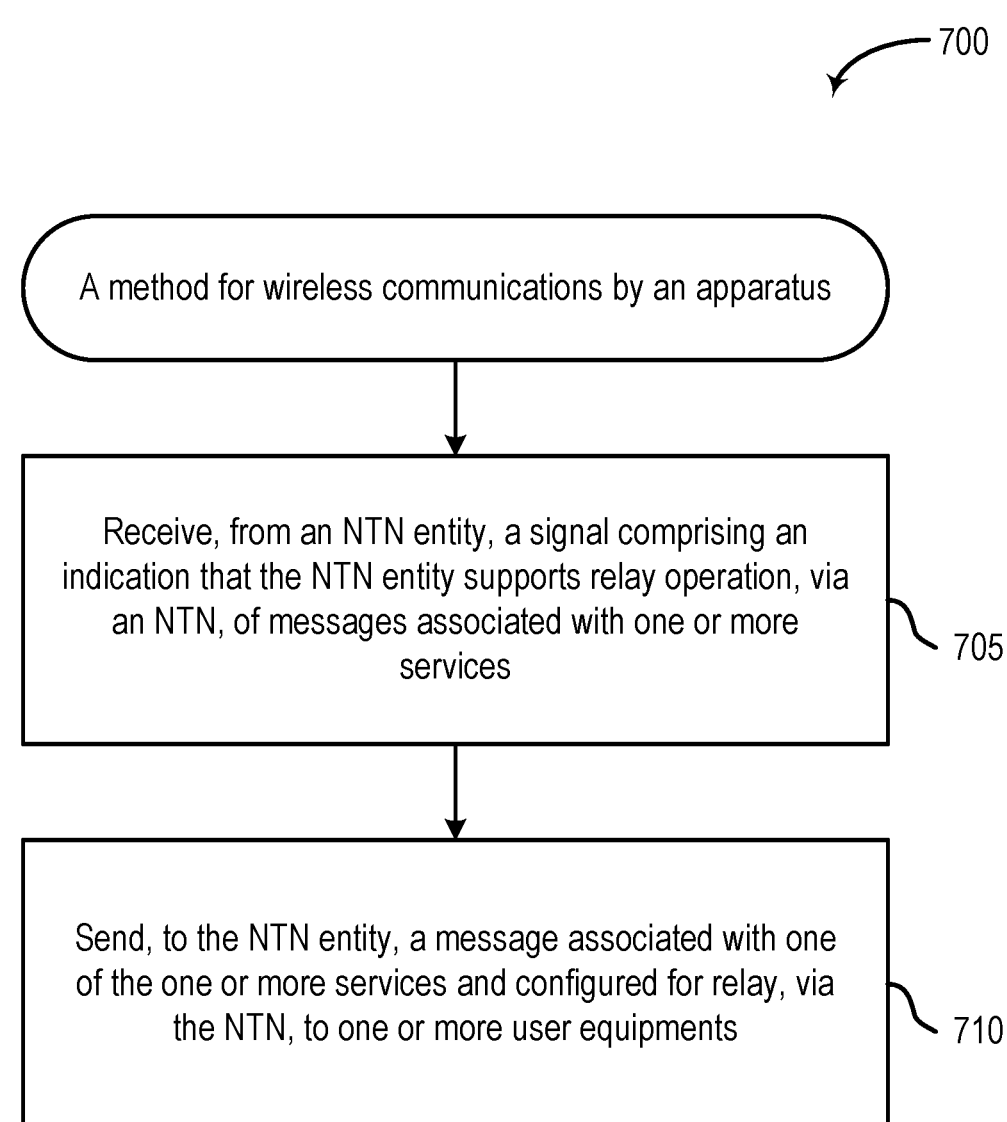
FIG. 7 depicts a method for wireless communications.

Example Operations of Apparatuses Participating in a Non-Terrestrial Communications Network FIG. 7 shows a method 700 for wireless communications by an apparatus, such as UE 104 of FIGS. 1 and 3.

Method 700 begins at step 705 with receiving, from an NTN entity, a signal comprising an indication that the NTN entity supports relay operation, via an NTN, of messages associated with one or more services. An NTN entity that supports relay operation provides an efficient solution for UEs to send and receive a message via one or more NTN entities in the NTN without the need for a feeder link to a ground network to complete the communication. For example, transmission delay and feeder link load is reduced as compared to communication over legacy NTNs. Additionally, when the UEs receive the indication, the UEs may no longer be required to set up and/or maintain a CN connection, which beneficially reduces signaling overhead and UE power consumption.

Method 700 then proceeds to step 710 with sending, to the NTN entity, a message associated with one of the one or more services and configured for relay, via the NTN, to one or more user equipments. The direct NTN communication between UEs that is provided by the relay operation of the NTN entity does not require a communicated message to utilize a feeder link/ground network, which can reduce latency and feeder link load. Furthermore, the relay operation of the NTN entity enables communication between UEs when there is no available feeder link.

In certain aspects, method 700 further includes determining that a first service is supported by the NTN entity based on the indication. For example, the UEs 104 may determine which of the one or more services are supported by the NTN based on the indication as depicted and described with reference to step 604 in FIG. 6.

In certain aspects, method 700 further includes generating, for sending, the message associated with the first service.

In certain aspects, step 710 includes sending the message over a Uu interface in an AS layer.

In certain aspects, the message comprises an ID corresponding to at least one of the one or more services or the one or more user equipments.

In certain aspects, the indication comprises information defining a coverage area for the NTN entity, and the coverage area defines an area that the NTN entity is capable of sending messages to or receiving messages from one or more user equipments. For example, the coverage area for the NTN entity may be the communication coverage area 110*a* of first satellite 142*a*, the communication coverage area 110*b* of the second satellite 142*b* or the communication coverage area 110*c* of the aircraft 145 as depicted and described with reference to FIG. 5.

In certain aspects, method 700 further includes determining a targeted receiving area based on location information associated with of the apparatus and a target range for transmitting a V2X message. For example, the targeted receiving area may be the targeted coverage area 112 as depicted and described with reference to FIG. 5.

In certain aspects, method 700 further includes determining, based on a determination that the coverage area includes the targeted receiving area, that a V2X service is supported by the NTN.

In certain aspects, method 700 further includes determining, based on a determination that the coverage area includes a location of a local data center, that an IoT service is supported by the NTN, wherein the location of the local data center is stored in the one or more memories of the apparatus.

In certain aspects, the indication comprises a configuration for use to transmit messages to or receive messages from the NTN entity.

In certain aspects, the configuration comprises at least one of (i) a radio resource configuration or (ii) a configuration associated with both a radio bearer and a logical channel.

In certain aspects, the indication comprises information defining at least one of a maximum message size capable of being relayed over the NTN or an expected latency of a communication over the NTN.

In certain aspects, method 700 further includes determining that a first service is supported by the NTN when a message size of the first service is less than or equal to the maximum message size or a latency requirement associated with the one of the one or more services is less than or equal to the expected latency of the NTN.

In certain aspects, the signal comprises the indication in a SIB.

In certain aspects, the signal comprises the indication in an RRC message.

Figure 10:
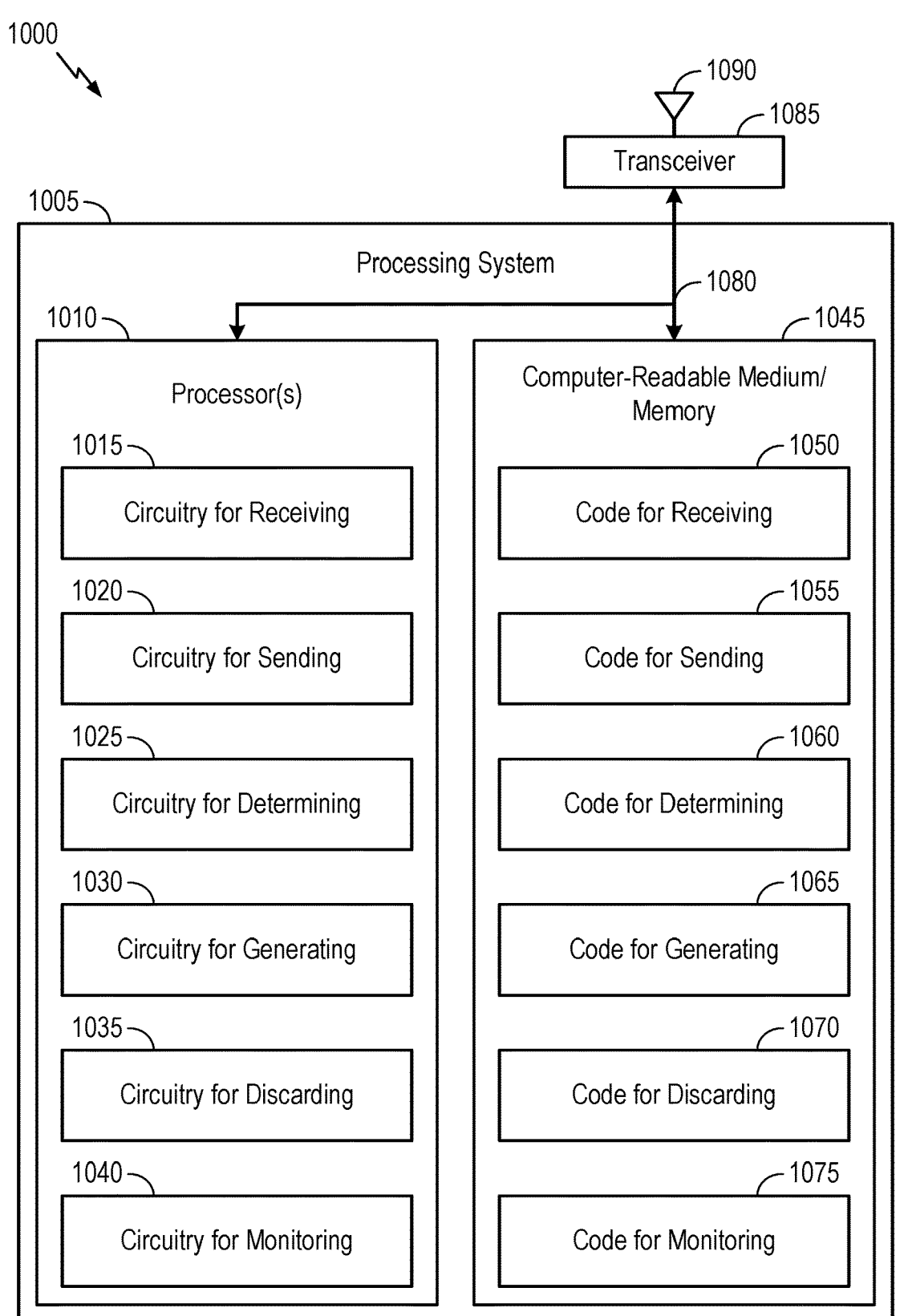
FIG. 10 depicts aspects of an example communications device.

In certain aspects, method 700, or any aspect related to it, may be performed by an apparatus, such as communications device 1000 of FIG. 10, which includes various components operable, configured, or adapted to perform the method 700. Communications device 1000 is described below in further detail.

Note that FIG. 7 is just one example of a method, and other methods including fewer, additional, or alternative steps are possible consistent with this disclosure.

Example Operations of a Non-Terrestrial Network Entity

FIG. 8 shows a method 800 for wireless communications by an apparatus, such as an NTN entity 140 of FIGS. 1, 5, and 6 including functionality of a BS of FIGS. 1 and 3 or a disaggregated base station as discussed with respect to FIG. 2.

Method 800 begins at step 805 with broadcasting a signal comprising an indication that the NTN entity is configured to support relay operation, via an NTN, of messages associated with one or more services. For example, step 805 corresponds to the NTN entity 140 broadcasting the indication at step 602 as depicted and described with reference to FIG. 6. An NTN entity that supports relay operation provides an efficient solution for UEs to send and receive a message via one or more NTN entities in the NTN without the need for a feeder link to a ground network to complete the communication. Additionally, when the UEs receive the indication, the UEs may no longer be required to set up and/or maintain a CN connection, which beneficially reduces signaling overhead and UE power consumption Method 800 then proceeds to step 810 with receiving a message from a first user equipment, the message associated with the one or more services. For example, step 810 corresponds to the NTN entity 140 receiving a transmitted message at step 608 as depicted and described with reference to FIG. 6.

Method 800 then proceeds to step 815 with sending, via the NTN, the message to one or more other user equipments. For example, step 815 corresponds to the NTN entity 140 forwarding the generated or modified generated message to one or more RX UEs (e.g., a second UE 104*b* and/or one or more other UEs 104*n*) at step 612 as depicted and described with reference to FIG. 6.

In certain aspects, method 800 further includes sending the message to the one or more other user equipments as a broadcast or a multicast over a Uu interface in an AS layer.

In certain aspects, method 800 further includes receiving the message from the first user equipment over a predefined resource.

In certain aspects, method 800 further includes determining that the message from the first user equipment is a transmission associated with the NTN based on the message being received over the predefined resource.

In certain aspects, method 800 further includes sending the message using the predefined resource to the one or more other user equipments.

In certain aspects, step 815 includes configuring a transmission signal of the message to the one or more other user equipments using a configuration associated with at least one of (i) a radio resource configuration or (ii) both a radio bearer and a logical channel.

In certain aspects, method 800 further includes receiving additional information with the message, the additional information comprising information pertaining to a location of the one or more other user equipments, wherein the one or more other user equipments are a target recipient of the message.

In certain aspects, method 800 further includes determining a targeted coverage area including the location of the target recipient for transmitting the message to, the targeted coverage area is less than a reachable area that the NTN entity is capable of sending messages to user equipments. For example, as depicted and described with reference to FIG. 5, the targeted coverage area 112 may be defined as a predefined distance around the UE 104, which is less than the reachable area (e.g., the communication coverage area 110*a*) that the NTN entity (e.g., the first satellite 142*a*) is capable of sending messages to user equipments.

In certain aspects, method 800 further includes sending the message such that the message is transmitted within the targeted coverage area.

In certain aspects, method 800 further includes receiving additional information with the message, the additional information comprising information pertaining to a location of the first user equipment.

In certain aspects, method 800 further includes determining a transmit area comprising a predetermined radius around the location of the first user equipment. For example, the transmit area may be the targeted coverage area 112 which is defined as a predefined distance around the UE 104 as depicted and described with reference to FIG. 5.

In certain aspects, method 800 further includes sending the message such that the message is transmitted within the transmit area.

In certain aspects, method 800 further includes generating a modified transmission signal of a received signal of the message from the first user equipment.

In certain aspects, method 800 further includes sending the message to the one or more other user equipments using the modified transmission signal.

In certain aspects, generating the modified transmission signal comprises amplifying the received signal.

In certain aspects, generating the modified transmission signal comprises converting a frequency of the received signal to a different frequency, the modified transmission signal using the different frequency for sending the message to the one or more other user equipments.

In certain aspects, step 815 includes sending the message to one or more other NTN entities, wherein the NTN entity and the one or more other NTN entities are configured to support communication, via the NTN, between two or more user equipments.

In certain aspects, method 800 further includes communicating with one or more other NTN entities to identify the one or more services that are supported over the NTN.

In certain aspects, method 800 further includes communicating with one or more other NTN entities to define a total reachable area of the NTN entity and the one or more other NTN entities based on a combination of a reachable area of the NTN entity and each reachable area of the one or more other NTN entities. For example, with reference to FIG. 5, the total reachable area of the NTN entity (e.g., the first satellite 142*a*) and the one or more other NTN entities (e.g., the second satellite 142*b*) may be the combined communication coverage areas of the first satellite 142*a* and the second satellite 142*b*, for example, communication coverage area 110*a* and communication coverage area 110*b* as depicted in FIG. 5.

In certain aspects, the NTN entity comprises a base station.

In certain aspects, the indication is broadcast in a SIB.

In certain aspects, the indication is transmitted in a dedicated RRC message.

Figure 11:
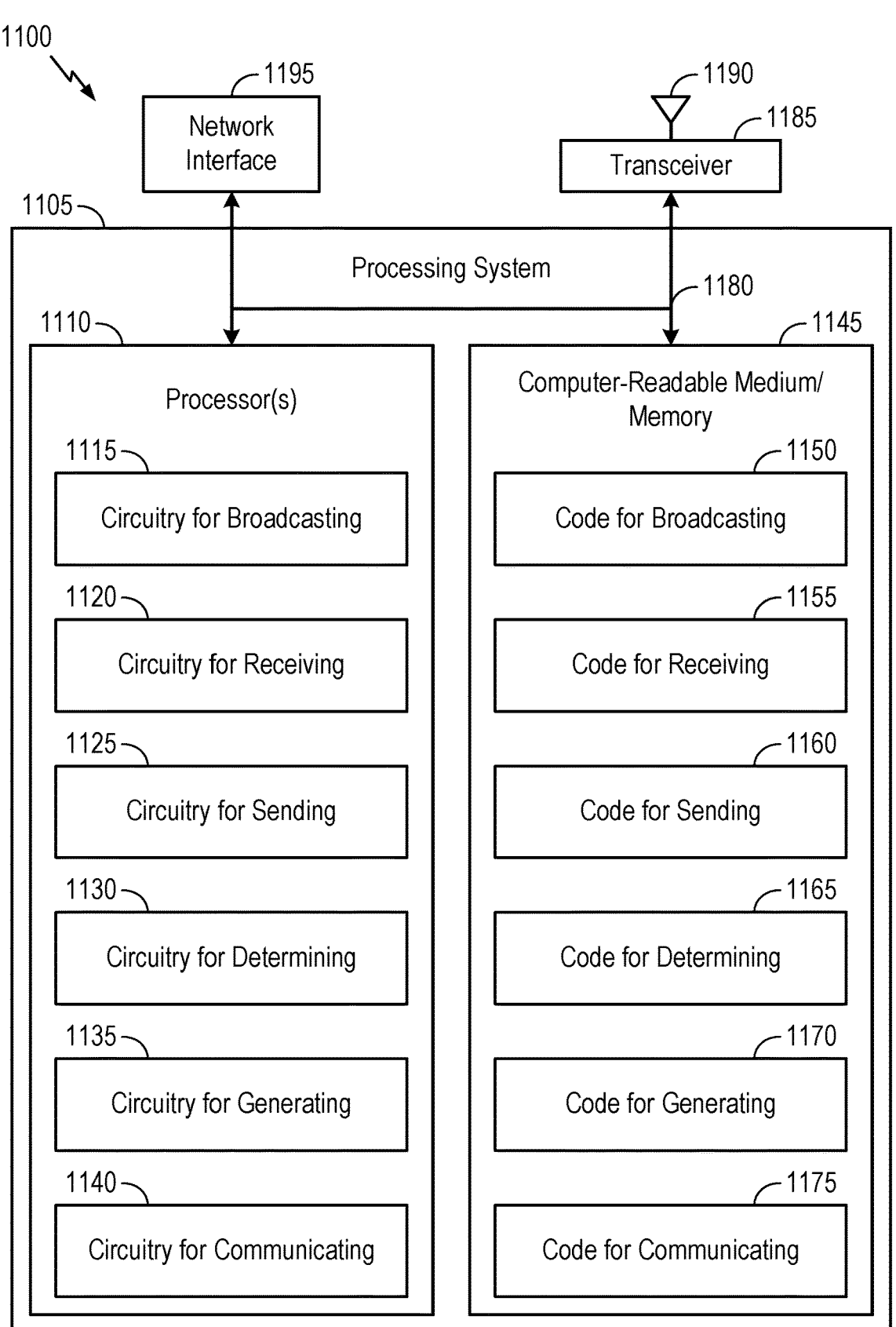
FIG. 11 depicts aspects of an example communications device.

In certain aspects, method 800, or any aspect related to it, may be performed by an apparatus, such as communications device 1100 of FIG. 11, which includes various components operable, configured, or adapted to perform the method 800. Communications device 1100 is described below in further detail.

Note that FIG. 8 is just one example of a method, and other methods including fewer, additional, or alternative steps are possible consistent with this disclosure.

Example Operations of Apparatuses Participating in a Non-Terrestrial Communications Network FIG. 9 shows a method 900 for wireless communications by an apparatus, such as UEs 104 of FIGS. 1, 3, and 5.

Method 900 begins at step 905 with receiving, from an NTN entity, a signal comprising an indication that the NTN entity supports relay operation, via an NTN, of messages associated with one or more services.

Method 900 then proceeds to step 910 with determining whether to monitor received transmissions for one or more messages associated with at least one of the one or more services based on the indication. For example, along with determining that one or more services are supported by the NTN based on the indication at step 604 as depicted and described with reference to FIG. 6, when the service the UE 104 desires to use is supported, the UE 104 can monitor received transmissions for one or more messages associated with at least one of the one or more services.

Method 900 then proceeds to step 915 with receiving, from the NTN entity, via the NTN, the one or more messages.

In certain aspects, method 900 further includes receiving a first message of the one or more messages, the first message comprising an ID. For example the ID comprised in the first message may be a UE ID or a service ID as discussed with reference to at least step 606 of FIG. 6.

In certain aspects, method 900 further includes determining whether the ID of the first message corresponds to a pre-configured ID for the apparatus.

In certain aspects, method 900 further includes discarding the first message when the ID does not correspond to the pre-configured ID for the apparatus.

In certain aspects, method 900 further includes receiving a first message of the one or more messages, the first message comprising an ID.

In certain aspects, method 900 further includes determining whether the ID of the first message corresponds to a service ID, the service ID corresponds to at least one of the one or more services.

In certain aspects, method 900 further includes discarding the first message when the ID does not correspond to the service ID.

In certain aspects, method 900 further includes monitoring within a preconfigured resource range for a signal corresponding to a message over the NTN.

In certain aspects, the preconfigured resource range is defined by a configuration associated with a radio bearer and a logical channel.

In certain aspects, method 900 further includes generating an acknowledgement message to the one or more messages received over the NTN.

In certain aspects, method 900 further includes sending, to the NTN entity, via the NTN, the acknowledgement message, the acknowledgement message configured for relay by the NTN entity to one or more user equipments.

In certain aspects, sending the acknowledgement message comprises configuring a transmission signal of the acknowledgement message using a configuration associated with a radio resource configuration or a radio bearer and a logical channel.

In certain aspects, method 900, or any aspect related to it, may be performed by an apparatus, such as communications device 1000 of FIG. 10, which includes various components operable, configured, or adapted to perform the method 900. Communications device 1000 is described below in further detail.

Note that FIG. 9 is just one example of a method, and other methods including fewer, additional, or alternative steps are possible consistent with this disclosure.

Example Communications Device

FIG. 10 depicts aspects of an example communications device 1000. In some aspects, communications device 1000 is a user equipment, such as UE 104 described above with respect to FIGS. 1 and 3.

The communications device 1000 includes a processing system 1005 coupled to a transceiver 1085 (e.g., a transmitter and/or a receiver). The transceiver 1085 is configured to transmit and receive signals for the communications device 1000 via an antenna 1090, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor

366, and/or controller/processor 380, as described with respect to FIG. 3. The one or more processors 1010 are coupled to a computer-readable medium/memory 1045 via a bus 1080. In certain aspects, the computer-readable medium/memory 1045 is configured to store instructions (e.g., computer-executable code) that when executed by the one or more processors 1010, enable and cause the one or more processors 1010 to perform the method 700 described with respect to FIG. 7, or any aspect related to it, including any additional steps or sub-steps described in relation to FIG. 7; and the method 900 described with respect to FIG. 9, or any aspect related to it, including any additional steps or sub-steps described in relation to FIG. 9. Note that reference to a processor performing a function of communications device 1000 may include one or more processors performing that function of communications device 1000, such as in a distributed fashion.

In the depicted example, computer-readable medium/memory 1045 stores code for receiving 1050, code for sending 1055, code for determining 1060, code for generating 1065, code for discarding 1070, and code for monitoring 1075. Processing of the code 1050-1075 may enable and cause the communications device 1000 to perform the method 700 described with respect to FIG. 7, or any aspect related to it; and the method 900 described with respect to FIG. 9, or any aspect related to it.

The one or more processors 1010 include circuitry configured to implement (e.g., execute) the code stored in the computer-readable medium/memory 1045, including circuitry for receiving 1015, circuitry for sending 1020, circuitry for determining 1025, circuitry for generating 1030, circuitry for discarding 1035, and circuitry for monitoring 1040. Processing with circuitry 1015-1040 may enable and cause the communications device 1000 to perform the method 700 described with respect to FIG. 7, or any aspect related to it; and the method 900 described with respect to FIG. 9, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1085 and/or antenna 1090 of the communications device 1000 in FIG. 10, and/or one or more processors 1010 of the communications device 1000 in FIG. 10. Means for communicating, receiving or obtaining may include the transceivers 354, antenna(s) 352, receive processor 358, and/or controller/processor 380 of the UE 104 illustrated in FIG. 3, transceiver 1085 and/or antenna 1090 of the communications device 1000 in FIG. 10, and/or one or more processors 1010 of the communications device 1000 in FIG. 10.

FIG. 11 depicts aspects of an example communications device 1100. In some aspects, communications device 1100 is a non-terrestrial network entity, such as NTN entity 140 of FIGS. 1 and 5 including functionality of a BS of FIGS. 1 and 3 or a disaggregated base station as discussed with respect to FIG. 2.

The communications device 1100 includes a processing system 1105 coupled to a transceiver 1185 (e.g., a transmitter and/or a receiver) and/or a network interface 1195. The transceiver 1185 is configured to transmit and receive signals for the communications device 1100 via an antenna 1190, such as the various signals as described herein. The network interface 1195 is configured to obtain and send signals for the communications device 1100 via communications link(s), such as an ISL 120a of FIG. 5 or a service link 120b of FIG. 5. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1145 via a bus 1180. In certain aspects, the computer-readable medium/memory 1145 is configured to store instructions (e.g., computer-executable code) that when executed by the one or more processors 1110, enable and cause the one or more processors 1110 to perform the method 800 described with respect to FIG. 8, or any aspect related to it, including any additional steps or sub-steps described in relation to FIG. 8. Note that reference to a processor of communications device 1100 performing a function may include one or more processors of communications device 1100 performing that function, such as in a distributed fashion.

In the depicted example, the computer-readable medium/memory 1145 stores code for broadcasting 1150, code for receiving 1155, code for sending 1160, code for determining 1165, code for generating 1170, and code for communicating 1175. Processing of the code 1150-1175 may enable and cause the communications device 1100 to perform the method 800 described with respect to FIG. 8, or any aspect related to it.

The one or more processors 1110 include circuitry configured to implement (e.g., execute) the code stored in the computer-readable medium/memory 1145, including circuitry for broadcasting 1115, circuitry for receiving 1120, circuitry for sending 1125, circuitry for determining 1130, circuitry for generating 1135, and circuitry for communicating 1140. Processing with circuitry 1115-1140 may enable and cause the communications device 1100 to perform the method 800 described with respect to FIG. 8, or any aspect related to it.

More generally, means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1185 and/or antenna 1190 of the communications device 1100 in FIG. 11, and/or one or more processors 1110 of the communications device 1100 in FIG. 11. Means for communicating, receiving or obtaining may include the transceivers 332, antenna(s) 334, receive processor 338, and/or controller/processor 340 of the BS 102 illustrated in FIG. 3, transceiver 1185 and/or antenna 1190 of the communications device 1100 in FIG. 11, and/or one or more processors 1110 of the communications device 1100 in FIG. 11.

Example Clauses

Implementation examples are described in the following numbered clauses:

Clause 1: A method for wireless communications by an apparatus, comprising: receiving, from an NTN entity, a signal comprising an indication that the NTN entity supports relay operation, via an NTN, of messages associated with one or more services; and sending, to the NTN entity, a message associated with one of the one or more services and configured for relay, via the NTN, to one or more user equipments, wherein the message is to be relayed from the apparatus to the one or more user equipments without going through a feeder link.

Clause 2: The method of Clause 1, further comprising: determining that a first service is supported by the NTN entity based on the indication; and generating, for sending, the message associated with the first service.

Clause 3: The method of any one of Clauses 1-2, wherein sending the message comprises sending the message over a Uu interface in an AS layer.

Clause 4: The method of any one of Clauses 1-3, wherein the message comprises an ID corresponding to at least one of the one or more services or the one or more user equipments.

Clause 5: The method of any one of Clauses 1-4, wherein: the indication comprises information defining a coverage area for the NTN entity, and the coverage area defines an area that the NTN entity is capable of sending messages to or receiving messages from one or more user equipments.

Clause 6: The method of Clause 5, further comprising: determining a targeted receiving area based on location information associated with of the apparatus and a target range for transmitting a V2X message; and determining, based on a determination that the coverage area includes the targeted receiving area, that a V2X service is supported by the NTN.

Clause 7: The method of Clause 5, further comprising: determining, based on a determination that the coverage area includes a location of a local data center, that an IoT service is supported by the NTN, wherein the location of the local data center is stored in the one or more memories of the apparatus.

Clause 8: The method of any one of Clauses 1-7, wherein the indication comprises a configuration for use to transmit messages to or receive messages from the NTN entity.

Clause 9: The method of Clause 8, wherein the configuration comprises at least one of (i) a radio resource configuration or (ii) a configuration associated with both a radio bearer and a logical channel.

Clause 10: The method of any one of Clauses 1-9, wherein the indication comprises information defining at least one of a maximum message size capable of being relayed over the NTN or an expected latency of a communication over the NTN.

Clause 11: The method of Clause 10, further comprising determining that a first service is supported by the NTN when a message size of the first service is less than or equal to the maximum message size or a latency requirement associated with the one of the one or more services is less than or equal to the expected latency of the NTN.

Clause 12: The method of any one of Clauses 1-11, wherein the signal comprises the indication in a SIB.

Clause 13: The method of any one of Clauses 1-12, wherein the signal comprises the indication in an RRC message.

Clause 14: A method for wireless communications by an apparatus, comprising: broadcasting a signal comprising an indication that the NTN entity is configured to support relay operation, via an NTN, of messages associated with one or more services; receiving a message from a first user equipment, the message associated with the one or more services; and sending, via the NTN, the message to one or more other user equipments without going through a feeder link.

Clause 15: The method of Clause 14, further comprising sending the message to the one or more other user equipments as a broadcast or a multicast over a Uu interface in an AS layer.

Clause 16: The method of any one of Clauses 14-15, further comprising: receiving the message from the first user equipment over a predefined resource; determining that the message from the first user equipment is a transmission associated with the NTN based on the message being received over the predefined resource; and sending the message using the predefined resource to the one or more other user equipments.

Clause 17: The method of any one of Clauses 14-16, wherein sending the message to the one or more other user equipments comprises configuring a transmission signal of the message to the one or more other user equipments using a configuration associated with at least one of (i) a radio resource configuration or (ii) both a radio bearer and a logical channel.

Clause 18: The method of any one of Clauses 14-17, further comprising: receiving additional information with the message, the additional information comprising information pertaining to a location of the one or more other user equipments, wherein the one or more other user equipments are a target recipient of the message; determining a targeted coverage area including the location of the target recipient for transmitting the message to, the targeted coverage area is less than a reachable area that the NTN entity is capable of sending messages to user equipments; and sending the message such that the message is transmitted within the targeted coverage area.

Clause 19: The method of any one of Clauses 14-18, further comprising: receiving additional information with the message, the additional information comprising information pertaining to a location of the first user equipment; determining a transmit area comprising a predetermined radius around the location of the first user equipment; and sending the message such that the message is transmitted within the transmit area.

Clause 20: The method of any one of Clauses 14-19, further comprising: generating a modified transmission signal of a received signal of the message from the first user equipment; and sending the message to the one or more other user equipments using the modified transmission signal.

Clause 21: The method of Clause 20, wherein generating the modified transmission signal comprises amplifying the received signal.

Clause 22: The method of Clause 20, wherein generating the modified transmission signal comprises converting a frequency of the received signal to a different frequency, the modified transmission signal using the different frequency for sending the message to the one or more other user equipments.

Clause 23: The method of any one of Clauses 14-22, wherein sending, via the NTN, the message to the one or more other user equipments comprises sending the message to one or more other NTN entities, wherein the NTN entity and the one or more other NTN entities are configured to support communication, via the NTN, between two or more user equipments.

Clause 24: The method of any one of Clauses 14-23, further comprising communicating with one or more other NTN entities to identify the one or more services that are supported over the NTN.

Clause 25: The method of any one of Clauses 14-24, further comprising communicating with one or more other NTN entities to define a total reachable area of the NTN entity and the one or more other NTN entities based on a combination of a reachable area of the NTN entity and each reachable area of the one or more other NTN entities.

Clause 26: The method of any one of Clauses 14-25, wherein the NTN entity comprises a base station.

Clause 27: The method of any one of Clauses 14-26, wherein the indication is broadcast in a SIB.

Clause 28: The method of any one of Clauses 14-27, wherein the indication is transmitted in a dedicated RRC message.

Clause 29: A method for wireless communications by an apparatus, comprising: receiving, from an NTN entity, a signal comprising an indication that the NTN entity supports relay operation, via an NTN, of messages associated with one or more services; determining whether to monitor received transmissions for one or more messages associated with at least one of the one or more services based on the indication; and receiving, from the NTN entity, via the NTN, the one or more messages.

Clause 30: The method of Clause 29, further comprising: receiving a first message of the one or more messages, the first message comprising an ID; determining whether the ID of the first message corresponds to a pre-configured ID for the apparatus; and when the ID does not correspond to the pre-configured ID for the apparatus, discarding the first message.

Clause 31: The method of any one of Clauses 29-30, further comprising: receiving a first message of the one or more messages, the first message comprising an ID; determining whether the ID of the first message corresponds to a service ID, the service ID corresponds to at least one of the one or more services; and when the ID does not correspond to the service ID, discarding the first message.

Clause 32: The method of any one of Clauses 29-31, further comprising monitoring within a preconfigured resource range for a signal corresponding to a message over the NTN.

Clause 33: The method of Clause 32, wherein the pre-configured resource range is defined by a configuration associated with a radio bearer and a logical channel.

Clause 34: The method of any one of Clauses 29-33, further comprising: generating an acknowledgement message to the one or more messages received over the NTN; and sending, to the NTN entity, via the NTN, the acknowledgement message, the acknowledgement message configured for relay by the NTN entity to one or more user equipments.

Clause 35: The method of Clause 34, wherein sending the acknowledgement message comprises configuring a transmission signal of the acknowledgement message using a configuration associated with a radio resource configuration or a radio bearer and a logical channel.

Clause 36: One or more apparatuses, comprising: one or more memories comprising executable instructions; and one or more processors configured to execute the executable instructions and cause the one or more apparatuses to perform a method in accordance with any one of clauses 1-35.

Clause 37: One or more apparatuses, comprising means for performing a method in accordance with any one of clauses 1-35.

Clause 38: One or more non-transitory computer-readable media comprising executable instructions that, when executed by one or more processors of one or more apparatuses, cause the one or more apparatuses to perform a method in accordance with any one of clauses 1-35.

Clause 39: One or more computer program products embodied on one or more computer-readable storage media comprising code for performing a method in accordance with any one of clauses 1-35.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." For example, reference to an element (e.g., "a processor," "a controller," "a memory," etc.), unless otherwise specifically stated, should be understood to refer to one or more elements (e.g., "one or more processors," "one or more controllers," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising one or more processors, coupled to one or more memories, and configured to cause the apparatus to:

receive, from a non-terrestrial network (NTN) entity, a signal comprising an indication that the NTN entity supports relay operation, via an NTN, of messages associated with one or more services; and send, to the NTN entity, a message associated with one of the one or more services and configured for relay, via the NTN, to one or more user equipments, wherein the message is to be relayed from the apparatus to the one or more user equipments via the NTN entity without going through a feeder link, wherein:

(i) the one or more processors are configured to cause the apparatus to: send the message to the NTN entity over a predefined resource, wherein the message is to be relayed to the one or more user equipments using the predefined resource;

(ii) the one or more processors are configured to cause the apparatus to: send first additional information with the message, wherein the first additional information comprises information pertaining to a location of the one or more other user equipments, wherein the one or more other user equipments are a target recipient of the message, wherein the message is to be relayed to the one or more user equipments within a targeted coverage area that includes the location of the target recipient, wherein the targeted coverage area is less than a reachable area that the NTN entity is capable of sending messages to user equipments; or (iii) the one or more processors are configured to cause the apparatus to: send second additional information with the message, wherein the second additional information comprises information pertaining to a location of the first user equipment, wherein the message is to be relayed to the one or more user equipments within a transmit area that comprises a predetermined radius around the location of the first user equipment.

2. The apparatus of claim 1, wherein the one or more processors are configured to cause the apparatus to: send the message to the NTN entity over the predefined resource, wherein the message is to be relayed to the one or more user equipments using the predefined resource.

3. The apparatus of claim 1, wherein the one or more processors are configured to cause the apparatus to: send first additional information with the message, wherein the first additional information comprises the information pertaining to the location of the one or more other user equipments, wherein the one or more other user equipments are the target recipient of the message, wherein the message is to be relayed to the one or more user equipments within the targeted coverage area that includes the location of the target recipient, wherein the targeted coverage area is less than the reachable area that the NTN entity is capable of sending messages to user equipments.

4. The apparatus of claim 1, wherein the one or more processors are configured to cause the apparatus to: send the second additional information with the message, wherein the second additional information comprises information pertaining to the location of the first user equipment, wherein the message is to be relayed to the one or more user equipments within the transmit area that comprises the predetermined radius around the location of the first user equipment.

5. A method for wireless communications by an apparatus, comprising:

receiving, from a non-terrestrial network (NTN) entity, a signal comprising an indication that the NTN entity supports relay operation, via an NTN, of messages associated with one or more services; and sending, to the NTN entity, a message associated with one of the one or more services and configured for relay, via the NTN, to one or more user equipments, wherein the message is to be relayed from the apparatus to the one or more user equipments via the NTN entity without going through a feeder link, wherein:

(i) the method comprises: sending the message to the NTN entity over a predefined resource, wherein the message is to be relayed to the one or more user equipments using the predefined resource;

(ii) the method comprises: sending first additional information with the message, wherein the first additional information comprises information pertaining to a location of the one or more other user equipments, wherein the one or more other user equipments are a target recipient of the message, wherein the message is to be relayed to the one or more user equipments within a targeted coverage area that includes the location of the target recipient, wherein the targeted coverage area is less than a reachable area that the NTN entity is capable of sending messages to user equipments; or (iii) the method comprises: sending second additional information with the message, wherein the second additional information comprises information pertaining to a location of the first user equipment, wherein the message is to be relayed to the one or more user equipments within a transmit area that comprises a predetermined radius around the location of the first user equipment.

6. The method of claim 5, comprising: sending the message to the NTN entity over the predefined resource, wherein the message is to be relayed to the one or more user equipments using the predefined resource.

7. The method of claim 5, comprising: sending the first additional information with the message, wherein the first additional information comprises the information pertaining to the location of the one or more other user equipments, wherein the one or more other user equipments are the target recipient of the message, wherein the message is to be relayed to the one or more user equipments within the targeted coverage area that includes the location of the target recipient, wherein the targeted coverage area is less than the reachable area that the NTN entity is capable of sending messages to user equipments.

8. The method of claim 5, comprising: sending the second additional information with the message, wherein the second additional information comprises information pertaining to the location of the first user equipment, wherein the message is to be relayed to the one or more user equipments within the transmit area that comprises the predetermined radius around the location of the first user equipment.

9. A non-terrestrial network (NTN) entity configured for wireless communications, comprising one or more processors, coupled to one or more memories, and configured to cause the NTN entity to:

broadcast a signal comprising an indication that the NTN entity is configured to support relay operation, via an NTN, of messages associated with one or more services;

receive a message from a first user equipment, the message associated with the one or more services; and send, via the NTN, the message to one or more other user equipments without going through a feeder link, wherein:

(i) the one or more processors are configured to cause the NTN entity to: receive the message from the first user equipment over a predefined resource; determine that the message from the first user equipment is a transmission associated with the NTN based on reception of the message over the predefined resource; and send the message using the predefined resource to the one or more other user equipments; or (ii) the one or more processors are configured to cause the NTN entity to: receive first additional information with the message, wherein the first additional information comprises information pertaining to a location of the one or more other user equipments, and wherein the one or more other user equipments are a target recipient of the message; determine a targeted coverage area including the location of the target recipient to which the message is to be transmitted, wherein the targeted coverage area is less than a reachable area that the NTN entity is capable of sending messages to user equipments; and send the message such that the message is transmitted within the targeted coverage area; or (iii) the one or more processors are configured to cause the NTN entity to: receive second additional information with the message, wherein the second additional information comprises information pertaining to a location of the first user equipment; determine a transmit area comprising a predetermined radius around the location of the first user equipment; and send the message such that the message is transmitted within the transmit area.

10. The non-terrestrial network entity of claim 9, wherein the one or more processors are configured to cause the NTN entity to send the message to the one or more other user equipments as a broadcast or a multicast over a Uu interface in an Access Stratum (AS) layer.

11. The non-terrestrial network entity of claim 9, wherein the one or more processors are configured to cause the NTN entity to:
receive the message from the first user equipment over the predefined resource;
determine that the message from the first user equipment is the transmission associated with the NTN based on reception of the message being received over the predefined resource; and
send the message using the predefined resource to the one or more other user equipments.

12. The non-terrestrial network entity of claim 9, wherein, to send the message to the one or more other user equipments, the one or more processors are configured to cause the NTN entity to configure a transmission signal of the message to the one or more other user equipments using a configuration associated with at least one of (i) a radio resource configuration or (ii) both a radio bearer and a logical channel.

13. The non-terrestrial network entity of claim 9, wherein the one or more processors are configured to cause the NTN entity to:
receive the first additional information with the message, wherein the first additional information comprises information pertaining to a location of the one or more other user equipments, and wherein the one or more other user equipments are the target recipient of the message;
determine the targeted coverage area including the location of the target recipient to which the message is to be transmitted, wherein the targeted coverage area is less than the reachable area that the NTN entity is capable of sending messages to user equipments; and
send the message such that the message is transmitted within the targeted coverage area.

14. The non-terrestrial network entity of claim 9, wherein the one or more processors are configured to cause the NTN entity to:

receive the second additional information with the message, wherein the second additional information comprises information pertaining to the location of the first user equipment;
determine the transmit area comprising the predetermined radius around the location of the first user equipment; and
send the message such that the message is transmitted within the transmit area.

15. The non-terrestrial network entity of claim 9, wherein the one or more processors are configured to cause the NTN entity to:
generate a modified transmission signal of a received signal of the message from the first user equipment; and
send the message to the one or more other user equipments using the modified transmission signal.

16. The non-terrestrial network entity of claim 15, wherein, to generate the modified transmission signal, the one or more processors are configured to cause the NTN entity to: amplify the received signal.

17. The non-terrestrial network entity of claim 15, wherein, to generate the modified transmission signal, the one or more processors are configured to cause the NTN entity to: convert a frequency of the received signal to a different frequency, the modified transmission signal using the different frequency for transmission of the message to the one or more other user equipments.

18. The non-terrestrial network entity of claim 9, wherein, to send, via the NTN, the message to the one or more other user equipments, the one or more processors are configured to cause the NTN entity to send the message to one or more other NTN entities, wherein the NTN entity and the one or more other NTN entities are configured to support communication, via the NTN, between two or more user equipments.

19. The non-terrestrial network entity of claim 9, wherein the one or more processors are configured to cause the NTN entity to communicate with one or more other NTN entities to identify the one or more services that are supported over the NTN.

20. The non-terrestrial network entity of claim 9, wherein the one or more processors are configured to cause the NTN entity to communicate with one or more other NTN entities to define a total reachable area of the NTN entity and the one or more other NTN entities based on a combination of a reachable area of the NTN entity and each reachable area of the one or more other NTN entities.

21. A method for wireless communications by an apparatus, comprising:
broadcasting a signal comprising an indication that the NTN entity is configured to support relay operation, via an NTN, of messages associated with one or more services;
receiving a message from a first user equipment, the message associated with the one or more services; and
sending, via the NTN, the message to one or more other user equipments without going through a feeder link, wherein:
(i) the method further comprises: receiving the message from the first user equipment over a predefined resource; determining that the message from the first user equipment is a transmission associated with the NTN based on reception of the message over the predefined resource; and sending the message using the predefined resource to the one or more other user equipments; or ii) the method further comprises: receiving first additional information with the message, wherein the first additional information comprises information pertaining to a location of the one or more other user equipments, and wherein the one or more other user equipments are a target recipient of the message; determining a targeted coverage area including the location of the target recipient to which the message is to be transmitted, wherein the targeted coverage area is less than a reachable area that the NTN entity is capable of sending messages to user equipments; and sending the message such that the message is transmitted within the targeted coverage area; or (iii) the method further comprises: receiving second additional information with the message, wherein the second additional information comprises information pertaining to a location of the first user equipment; determining a transmit area comprising a predetermined radius around the location of the first user equipment; and sending the message such that the message is transmitted within the transmit area.

22. The method of claim 21, comprising:

receiving the message from the first user equipment over the predefined resource;

determining that the message from the first user equipment is the transmission associated with the NTN based on reception of the message over the predefined resource; and sending the message using the predefined resource to the one or more other user equipments.

23. The method of claim 21, comprising:

receiving the first additional information with the message, wherein the first additional information comprises information pertaining to a location of the one or more other user equipments, and wherein the one or more other user equipments are the target recipient of the message;

determining the targeted coverage area including the location of the target recipient to which the message is to be transmitted, wherein the targeted coverage area is less than the reachable area that the NTN entity is capable of sending messages to user equipments; and sending the message such that the message is transmitted within the targeted coverage area.

24. The method of claim 21, comprising:

receiving the second additional information with the message, wherein the second additional information comprises information pertaining to the location of the first user equipment;

determining the transmit area comprising the predetermined radius around the location of the first user equipment; and sending the message such that the message is transmitted within the transmit area.

* * * * *